UNITED STATES PATENT OFFICE.

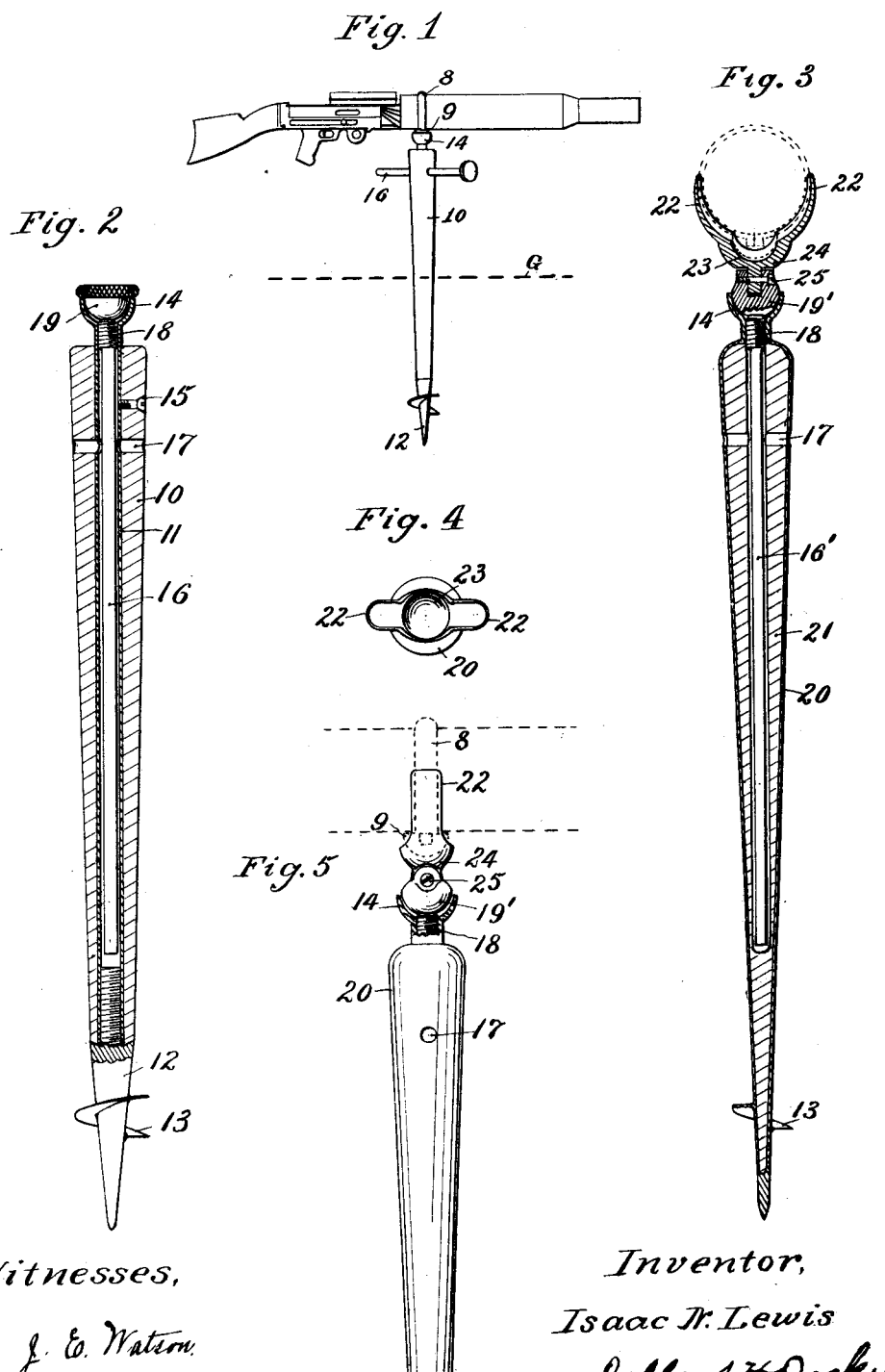

ISAAC N. LEWIS, OF FORT HAMILTON, NEW YORK.

STAKE-MOUNT FOR FIREARMS.

1,107,805.   Specification of Letters Patent.   Patented Aug. 18, 1914.

Application filed January 15, 1913. Serial No. 742,236.

*To all whom it may concern:*

Be it known that I, ISAAC N. LEWIS, a citizen of the United States, residing at Fort Hamilton, in the county of Kings and State of New York, have invented certain new and useful Improvements in Stake-Mounts for Firearms, of which the following is a specification.

This invention relates to mounts or rests for firearms and is particularly designed for use with the Lewis automatic, gas-operated, air-cooled arms. The rest or mount is in reality a stake to be inserted in the ground and may therefore be termed a stake mount.

The object of the invention is the production of a mount, for the purpose specified, which shall be well adapted for transportation and for quickly and easily fixing in place for use.

The invention therefore consists in the structure of parts and in their combination substantially as hereinafter described and claimed.

The accompanying drawing forms a part of this specification and therein the invention is illustrated in a general way without intention to restrict it to special details of construction.

In Figure 1, the mount is graphically represented as inserted in the ground and supporting an automatic firearm of the Lewis air-cooled, non-recoiling type. Fig. 2 represents, in axial section, the stake mount ready for transportation. Fig. 3 is an axial section of the present preferred form of stake mount. Fig. 4. is a plan of the mount seen in Fig. 3, and Fig. 5 is a partially sectionized side elevation of the upper portion of the mount of Fig. 3 viewed from the right.

In the Lewis gas-operated, air-cooled gun illustrated in Fig. 1, the band 8 has on its underside a spheroidal nut 9, which in reality unites the two ends of said band. This band and nut form convenient means with which to associate the mount or rest of this invention. To arms not having these parts they may obviously be readily applied.

The simplest form of mount designed for the embodiment of this invention is that of Figs. 1 and 2. It consists of a conoidal stick of hard wood 10 axially bored to receive a metal tube 11 to whose lower end is attached a steel point 12 preferably provided with an auger fin 13. This point is here shown as having a shank screwed into the tube and countersunk about the shank to receive the lower end of the wooden stake. The upper end of the tube is belled to serve as a cup 14 for the reception of the nut 9. A set screw 15 may be passed through the wood into the tube, or any other expedient may be employed, to hold the wood and tube together. A hand lever 16 is provided for turning the mount into the ground, a hole 17 being bored transversely through the mount to receive the lever. This hand lever may be most conveniently carried by inserting it in the tube 11. To retain it there, it is preferably provided with a screw section at 18 and the tube provided with a corresponding screw section in the neck below the cup. The lever is also provided with a milled head for ready insertion and withdrawal from within the stake. It is essential to protect the cup 14 from accidental distortion, therefore a bulbous projection 19 is provided on the lever next to the milled head.

Another mode of construction for the stake is that seen in axial section in Fig. 3. Therein a conoidal tube 20 is spun over a wooden core 21, and provided with a cup 14, screw-threaded in the neck below the cup to receive the screw on the hand lever, and also provided at its point with the auger fin 13. The wooden core is axially bored to receive the lever 16' and the stake is also provided with the transverse bore 17.

Another mode of construction of the gun-supporting device, at the upper end of the stake, is illustrated in Figs. 3, 4 and 5. This device is in the form of a fork constructed to receive the band 8 of the gun as well as the spheroidal nut 9. Such a supporting device will retain the gun on the mount when not in use. To this end the fork is provided with curved, transversely concaved tines 22 to embrace the band 8 and with a depression 23 at the base of the tines to receive the nut 9, and has its shank 24 hinged to the head of the hand lever 16' by pintle 25. The head of the hand lever is, as before, provided with a bulbous projection 19' but is devoid of the milled head, the hinged fork serving instead to assist in the insertion and removal of the lever from within the stake.

The stakes of Figs. 2 and 3 may be used interchangeably with the gun of Fig. 1, the spheriodal nut 9 being inserted in the cup 14, forming therewith, in effect, a ball-and-socket joint whereby freedom of movement for direction and elevation of the gun is afforded. The hand levers of Figs. 2 and 3 may likewise be used interchangeably with the stakes of said figures. In using the hand lever 16′, the hinged fork provides for changes in elevation of the gun and by turning the hand lever out of its socket, say one turn, as indicated in Fig. 5, variations in direction of fire are readily provided for.

The dotted line G, in Fig. 1, indicates the surface of the ground. By turning the mount into the ground more or less the gun may be brought to that height required for operation when kneeling, sitting or lying prone.

It will be noted that the cup 14 is used with both forms of mounts. When the hinged support of Fig. 3 is provided on the hand lever, the cup serves as a temporary support for the gun, in testing the proper height of the mount, while the hand lever is in use for turning the stake into the ground, thereby enabling the operator to insert the stake to the right depth before screwing the said lever into the stake. Thus both forms of gun support exist in the same mount, one supplemental to the other. The bulbous projection 19′ is therefore provided on the hand lever 16′ to protect the cup 14, Fig. 3, the same as with the hand lever 16.

The invention claimed is:—

1. A mount for firearms consisting of a stake adapted to be secured in the ground and having a transverse hole near its upper end and an axial bore, both for the insertion of a hand lever and having on its upper end a device for receiving a gun and affording thereto movement for changes in direction and elevation.

2. A mount for firearms consisting of a conoidal tube spun over a wooden core and provided with a cup at its upper end for the purpose specified.

3. A mount for firearms consisting of a conoidal tube having a suitable core and provided with a cup at its upper end and having an internally screw-threaded neck below said cup, the core having an axial bore, in combination with a hand lever adapted to be inserted in the hollow axis of said mount and provided with a bulbous projection at its upper end fitted to said cup and screw-threaded to engage the thread in said neck.

4. A mount for firearms consisting of a stake provided with means for inserting it firmly in the ground and provided also with an axial bore to receive a hand lever, in combination with a hand lever insertible in said bore and provided with a gun support at its outer end.

5. A mount for firearms consisting of a stake provided with means for inserting it firmly in the ground and provided also with an axial bore screw-threaded for a section thereof, in combination with a hand lever adapted for insertion in said bore and having a screw-threaded portion for engaging with the screw-threaded section of the bore and provided at its outer end with a hinged fork adapted to receive and support a gun.

In testimony whereof I affix my signature in presence of two witnesses.

ISAAC N. LEWIS.

Witnesses:
EDWARD E. ADAMS,
HENRY W. RUDD.